United States Patent
Abeysekera et al.

(10) Patent No.: US 11,297,509 B2
(45) Date of Patent: Apr. 5, 2022

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Hirantha Abeysekera, Yokosuka (JP); Tomoki Murakami, Yokosuka (JP); Koichi Ishihara, Yokosuka (JP); Mamoru Akimoto, Yokosuka (JP); Yasushi Takatori, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/480,039

(22) PCT Filed: Jan. 25, 2018

(86) PCT No.: PCT/JP2018/002297
§ 371 (c)(1),
(2) Date: Jul. 23, 2019

(87) PCT Pub. No.: WO2018/139541
PCT Pub. Date: Aug. 2, 2018

(65) Prior Publication Data
US 2019/0394653 A1    Dec. 26, 2019

(30) Foreign Application Priority Data

Jan. 27, 2017    (JP) .............................. JP2017-013220

(51) Int. Cl.
*H04W 16/10*    (2009.01)
*H04W 24/02*    (2009.01)
(Continued)

(52) U.S. Cl.
CPC ............ *H04W 16/10* (2013.01); *H04W 24/02* (2013.01); *H04W 28/24* (2013.01); *H04W 84/12* (2013.01)

(58) Field of Classification Search
CPC ..... H04W 16/10; H04W 24/02; H04W 28/24; H04W 84/12
(Continued)

(56) References Cited

U.S. PATENT DOCUMENTS 7,313,113 B1    12/2007 Hills et al.
2006/0094371 A1*    5/2006 Nguyen ................ H04W 52/50
                                                                    455/67.13
(Continued)

FOREIGN PATENT DOCUMENTS

EP    1150458 A2    10/2001
JP    H05-284088 A    10/1993
(Continued)

OTHER PUBLICATIONS

International Preliminary Report on Patentability regarding PCT/JP2018/002297, including the English translation of the Written Opinion, dated Aug. 8, 2019.
(Continued)

*Primary Examiner* — Kwang B Yao
*Assistant Examiner* — Xuan Lu
(74) *Attorney, Agent, or Firm* — Harness, Dickey & Pierce, P.L.C.

(57) ABSTRACT

The each AP includes a control unit that detects, as the wireless environment information, a signal detection level for one or more neighboring APs positioned in the neighborhood of the AP and notifies the detected signal detection level to the central coordinator, and controls the ATT value by the setting in the central coordinator; and the central coordinator includes a parameter calculation unit that cal-
(Continued)

culates the ATT value for each the APs, based on the signal detection level for each the neighboring wireless access point notified from the plurality of APs and based on an RSSI threshold at which each the APs is able to secure a prescribed service area.

4 Claims, 7 Drawing Sheets

(51) Int. Cl.
*H04W 28/24* (2009.01)
*H04W 84/12* (2009.01)
*H04B 17/318* (2015.01)
*H04W 88/12* (2009.01)
*H04W 52/34* (2009.01)
*H04W 16/08* (2009.01)
*H04W 52/24* (2009.01)

(58) Field of Classification Search
USPC .......................................................... 370/338
See application file for complete search history.

(56) References Cited

U.S. PATENT DOCUMENTS

| | | |
|---|---|---|
| 2007/0263587 A1 | 11/2007 | Savoor et al. |
| 2008/0062942 A1 | 3/2008 | Hills et al. |
| 2008/0240008 A1* | 10/2008 | Backes ............... H04W 52/226 370/311 |
| 2010/0085884 A1* | 4/2010 | Srinivasan .......... H04W 52/343 370/252 |
| 2014/0119220 A1* | 5/2014 | Wang .................. H04W 52/367 370/252 |
| 2014/0302869 A1 | 10/2014 | Rosenbaum et al. |
| 2014/0321300 A1* | 10/2014 | Yoon .................... H04W 52/245 370/252 |

FOREIGN PATENT DOCUMENTS

| | | |
|---|---|---|
| JP | H09-163443 A | 6/1997 |
| JP | 2004-242076 A | 8/2004 |
| JP | 2007-518361 A | 7/2007 |
| JP | 2008-252253 A | 10/2008 |
| KR | 10-2012-0134906 A | 12/2012 |
| WO | WO-2005/069519 A1 | 7/2005 |

OTHER PUBLICATIONS

Korean Office Action regarding application No. 10-2019-7020686, dated May 21, 2020. Machine Translation included.
Jing Zhu et al., "Adaptive CSMA for Scalable Network Capacity in High-Density WLAN: a Hardware Prototyping Approach"; the Proceedings IEEE Infocom, 2006.
H. Ma, et al.; "On Loss Differentiation for CSMA-Based Dense Wireless Network"; IEEE Communications Letters, vol. 11, No. 11, Nov. 2007; pp. 877-879.
Taiwanese Office Action (in English and Taiwanese) issued in Taiwanese Application No. 107102907, dated Sep. 17, 2018.
Taiwanese Office Action (in English and Taiwanese) issued in Taiwanese Patent Application No. 107102907, dated May 14, 2019.
International Search Report (English and Japanese) issued in International Application No. PCT/JP2018/002297, dated Apr. 17, 2018; ISA/JP.

* cited by examiner

FIG. 5
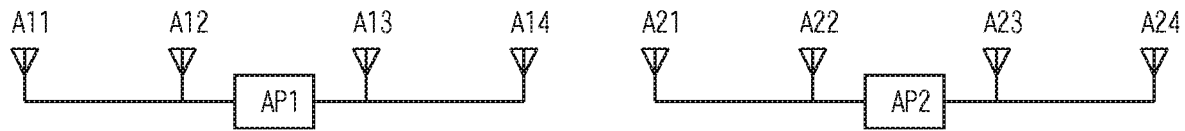
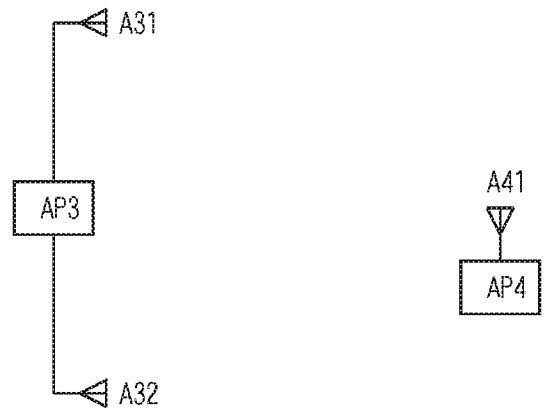
FIG. 6
| AP receiving beacon | antenna | setting ATT value | RSSI value for each antenna and each neighboring AP | | | |
|---|---|---|---|---|---|---|
| | | | A P 1 | A P 2 | A P 3 | A P 4 |
| A P 1 | A11 | 1 | | not detected | −93 | not detected |
| | A12 | 0 | | −80 | −83 | not detected |
| | A13 | 0 | | −70 | −83 | −85 |
| | A14 | 1 | | −60 | −93 | −73 |
| A P 2 | A21 | 0 | −61 | | −93 | −65 |
| | A22 | 0 | −71 | | not detected | −75 |
| | A23 | 0 | −81 | | not detected | −85 |
| | A24 | 0 | not detected | | not detected | not detected |
| A P 3 | A31 | 10 | −76 | −80 | | not detected |
| | A32 | 3 | not detected | not detected | | −90 |
| A P 4 | A41 | 5 | −76 | −65 | −88 | |

FIG. 7

| AP receiving beacon | antenna | minimum ATT value | RSSI value for each antenna and each neighboring AP ||||
|---|---|---|---|---|---|---|
| | | | AP 1 | AP 2 | AP 3 | AP 4 |
| AP 1 | A11 | 0 | | not detected | −93→−90 | not detected |
| | A12 | | | −80 | −83→−80 | not detected |
| | A13 | | | −70 | −83→−80 | −85→−80 |
| | A14 | | | −60 | −93→−90 | −73→−68 |
| AP 2 | A21 | 0 | −61 | | −93→−90 | −65→−60 |
| | A22 | | −71 | | not detected | −75→−70 |
| | A23 | | −81 | | not detected | −85→−80 |
| | A24 | | not detected | | not detected | not detected |
| AP 3 | A31 | 3 | −76 | −80 | | not detected |
| | A32 | | not detected | not detected | | −90→−85 |
| AP 4 | A41 | 5 | −76 | −65 | −88→−85 | |

FIG. 8

| AP receiving beacon | antenna | minimum ATT value | RSSI value for each neighboring AP ||||
|---|---|---|---|---|---|---|
| | | | AP 1 | AP 2 | AP 3 | AP 4 |
| AP 1 | A11 | 0 | | −60 | −80 | −68 |
| | A12 | | | | | |
| | A13 | | | | | |
| | A14 | | | | | |
| AP 2 | A21 | 0 | −61 | | −90 | −60 |
| | A22 | | | | | |
| | A23 | | | | | |
| | A24 | | | | | |
| AP 3 | A31 | 3 | −76 | −80 | | −85 |
| | A32 | | | | | |
| AP 4 | A41 | 5 | −76 | −65 | −85 | |

FIG. 9

| AP receiving beacon | antenna | change ATT value | RSSI value for each neighboring AP ||||
|---|---|---|---|---|---|---|
| | | | AP 1 | AP 2 | AP 3 | AP 4 |
| AP 1 | A11 | 1→0 | | −60 | −80 | −68★ |
| | A12 | 0→0 | | | | |
| | A13 | 0→0 | | | | |
| | A14 | 1→0 | | | | |
| AP 2 | A21 | 0→5 | −61 | | −90 | −60 |
| | A22 | 0→5 | | | | |
| | A23 | 0→5 | | | | |
| | A24 | 0→5 | | | | |
| AP 3 | A31 | 10→0 | −76★ | −80 | | −85 |
| | A32 | 3→0 | | | | |
| AP 4 | A41 | 5→2 | −76★ | −65★ | −85★ | |

⇩ ⇩ ⇩ ⇩ benchmark AP of AP1 is AP3, AP4    benchmark AP of AP2 is AP4    benchmark AP of AP3 is AP4    benchmark AP of AP4 is AP1

⇩ ⇩ ⇩ ⇩

ATT value of AP1 is 0 dB    ATT value of AP2 is 5 dB    ATT value of AP3 is 0 dB    ATT value of AP4 is 2 dB FIG. 10
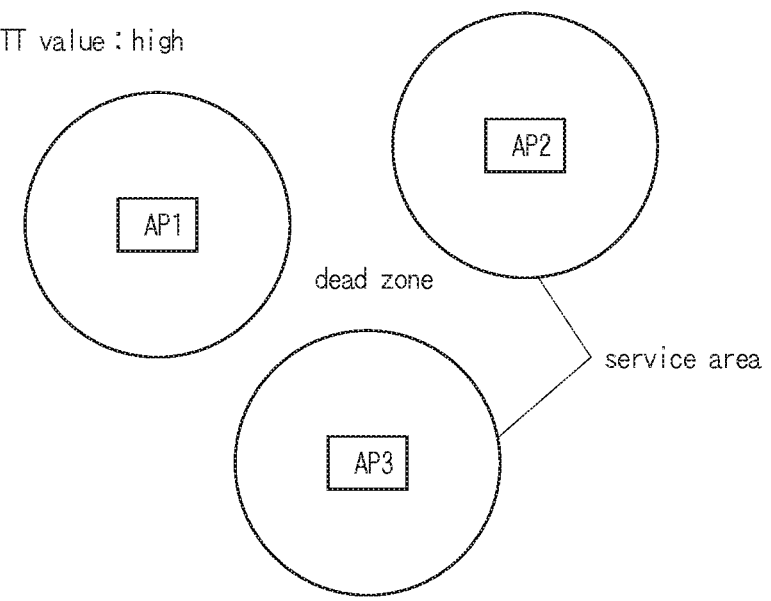
(1) ATT value : high
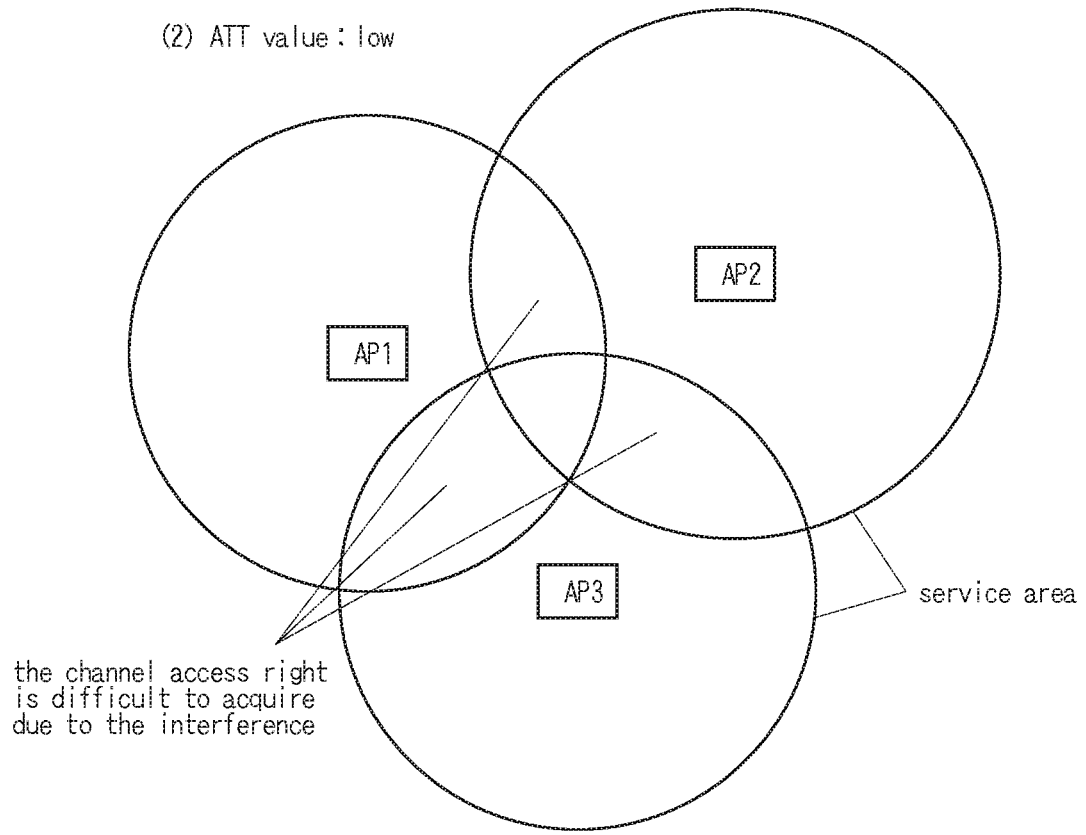
(2) ATT value : low

WIRELESS COMMUNICATION SYSTEM AND WIRELESS COMMUNICATION METHOD

CROSS REFERENCE TO RELATED APPLICATIONS

This application is a U.S. National Stage Application claiming the benefit of prior filed International Application No. PCT/JP2018/002297 filed on Jan. 25, 2018, in which the International Application claims priority from Japanese Patent Application No. 2017-013220, filed on Jan. 27, 2017. The entire disclosures of the above applications are incorporated herein by reference.

TECHNICAL FIELD

The present invention relates to a wireless communication system in which, in a central coordinator that is connected to multiple wireless access points, an attenuator value (ATT value) for a wireless access point is controlled that is used in order to secure a service area that is provided by each wireless access point, and a wireless communication method.

BACKGROUND ART

In recent years, with the spread of a high performance portable wireless station, such as a notebook computer or a smartphone, wireless local area networks (LANs) in compliance with the IEEE 802.11 standard have come into wide use not only in companies and public spaces, but also in ordinary houses. As the wireless LANs in compliance with the IEEE 802.11 standard, there are a wireless LAN in compliance with the IEEE 802.11b/g/n standard that uses a 2.4 GHz band, and a wireless LAN in compliance with the IEEE 802.11a/n/ac standard that uses a 5 GHz band.

In the wireless LAN in compliance with the IEEE 802.11b standard or the IEEE 802.11g, 13 standard channels are prepared at intervals of 5 MHz in a bandwidth of 2400 MHz to 2483.5 MHz. However, when using multiple channels in the same place, in order to avoid interference, channels that are not in the same band are used. In such a case, a maximum of three channels are used, and up to four channels can be used at the same time, depending on the place where the channels are used.

In the wireless LAN in compliance with the IEEE 802.11a standard, in Japan, it is stipulated that 8 channels in bands that do not overlap in a bandwidth of 5170 MHz to 5330 MHz and 11 channels in bands that do not overlap in a bandwidth of 5490 MHz to 5710 MHz, totaling 19 channels, should be used. It is noted that in the IEEE 802.11a standard, a bandwidth per channel is set to 20 MHz.

A maximum transfer speed in the wireless LAN is 11 Mbps in the IEEE 802.11b standard and is 54 Mbps in the IEEE 802.11a standard or the IEEE 802.11g standard. However, the transfer speed here is a transfer speed on a physical layer (PHY). Because a transfer efficiency in the Medium Access Control (MAC) layer is actually approximately 50 to 70%, an upper limit value of actual throughput is approximately 5 Mbps in the IEEE 802.11.b standard and is approximately 30 Mbps in the IEEE 802.11a standard or the IEEE 802.11g standard. Furthermore, if the number of communication devices that are going to transmit information increases, the transfer speed further decreases.

On the other hand, regarding a wired local area network (LAN), starting with a 100 Base-T interface for Ethernet (a registered trademark), Fiber to the home (FTTH) that uses an optical fiber has come into wide use in ordinary houses. Thus, a high speed line that supports 100 Mbps to 1 Gbps is provided and a further increase in the transfer speed is also required in the wireless LAN.

For this reason, in the IEEE 802.11n standard that results from completion of the standardization in 2009, a channel bandwidth was broadened from 20 MHz, which had been set up to that time, to a maximum of 40 MHz, and the introduction of spatial multiplexing techniques (Multiple input multiple output (MIMO)) were determined. When all functions that are stipulated in the IEEE 802.11n standard are applied, and thus transmission or reception is performed, it is possible that, in a physical layer, a communication speed of a maximum 600 Mbps is realized.

Moreover, in the IEEE 802.11ac standard that results from completion of the standardization in 2013, a channel bandwidth was broadened to 80 MHz or a maximum of 160 MHz, or the introduction of the multi-user MIMO (MU-MIMO) transmission scheme to which Space Division Multiple Access (SDMA) is applied was determined (for example, refer to NPL 1). When all functions that are stipulated in the IEEE 802.11ac standard are applied, and thus the transmission or reception is performed, it is possible that, in the physical layer, a communication speed of a maximum approximately 6.9 Gbps is realized.

However, when the channel bandwidth is broadened in the IEEE 802.11ac standard, the number of channels that are used at the same time in the same place in a bandwidth of 5 GHz is reduced. For example, 19 channels are available in a channel bandwidth of 20 MHz, but when channel bandwidths are set to 40 MHz, 80 HMz, and 160 HMz, the number of channels is reduced, that is, 9 channels, 4 channels, and 2 channels are available, respectively.

Furthermore, according to the channel bandwidth that is used for communication, the number of channels that are used in the same place at the same time is 3 in the wireless LAN in a bandwidth of 2.4 GHz, and is 2, 4, 9 or 19 in the wireless LAN of 5 GHz. Therefore, when the wireless LAN is actually installed, an access point (AP) needs to select a channel that is to be used within a cell (a Basic Service Set (BSS)) of the access point itself.

At this point, in a high density wireless LAN environment where the number of BSSs is greater than the number of available channels, multiple BSSs use the same channel (OBSS: Overlapping BSS). In such a case, due to an influence of interference among the BSSs that use the same channel, throughput of the BSS and throughput of an entire system are deceased. For this reason, in the wireless LAN, using Carrier Sense Multiple Access with Collision Avoidance (CSMA/CA), autonomous distributed access control is used that performs transmission of data only when a channel is unoccupied by carrier sense.

Specifically, in the communication device in which a transmission request takes place, first, the carrier sense is performed only during a prescribed sensing duration (Distributed Inter-Frame Space (DIFS)) and thus a state of a wireless medium is monitored. If a signal that is transmitted by any other wireless device is not present during this duration, random back-off is performed. The wireless device also performs the carrier sense during the random back-off, but if the signal that is transmitted by any other wireless station during this duration is also not present, the channel access right is obtained. The wireless device that obtains the channel access right can transmit data to any other wireless devices within the same BSS, or can receive data from these wireless devices. If this CSMA/CA control is performed, in the high density wireless LAN environment where the same channel is used, the frequency with which a channel is busy due to the carrier sense increases, and a transmission opportunity decreases. Thus, throughput decreases.

At this point, in performing the carrier sense in the AP, a Clear Channel Assessment (CCA) threshold for determining a channel use situation using a Received Signal Strength Indicator (RSSI) is set. For example, in the IEEE 802.11 standard, two CCA thresholds are stipulated. A first CCA-Signal Detection (SD) threshold is set if a preamble of a wireless LAN signal can be detected from a reception signal that is received when the carrier sense is performed. A second CCA-Energy Detection (ED) threshold is set if the preamble of the wireless LAN signal cannot be detected from the reception signal that is received when the carrier sense is performed. For example, in the IEEE 802.11a standard, the CCA-SD threshold is set to −82 dBm, and the CCA-ED threshold is set to −62 dBm.

If, with the carrier sense, the RSSI is at or above the CCA-SD threshold and the preamble of the wireless LAN signal is detected, it is determined that a related channel is busy and that communication is not available. Furthermore, even if, with the carrier sense, the preamble of the wireless LAN signal cannot be detected, when the RSSI of the reception signal is at or above the CCA-ED threshold, the reception signal is regarded as an interference wave from a neighboring BSS or any other system and thus it is determined that a related channel is busy and that communication is not available. Otherwise, it is determined that a channel is idle and that communication is available. If "CCA threshold" is hereinafter simply referred to, the "CCA threshold" is defined as including the CCA-SD threshold and the CCA-ED threshold.

In this manner, in the wireless LAN in compliance with the IEEE 802.11 standard, when the AP forms the BSS, there is a need to determine on which channel of channels that are available within the BSS of the AP itself an operation takes place, how much transmission power is provided to transmit a wireless signal, and so on.

The AP writes a setting value of a parameter that is used in the BSS of the AP itself, and other parameters that are in effect in the BSS of the AP itself, into a probe response frame that responds to a beacon frame that is periodically transmitted, a probe request frame from the wireless station. Then, the AP transmits these frames on a channel the operation of which is determined, and gives wireless stations belonging to the AP and any other neighboring wireless devices a notice to that effect, and thus a BSS operation is performed.

At this point, in addition to the CCA threshold that is used for the carrier sense, the CSMA/CA, the setting values of the parameters that are used in the BSS of the AP itself include parameter values, such as a transmission power value, a receiving sensitively (RS) threshold that determines reception sensitivity, minimum and maximum values of Contention Window (CW), that relates to acquisition of the right to access, and parameter values, such as Quality of Services (QoS). Furthermore, other parameters that are possibly in effect in the AP itself include a bandwidth that is used for frame transmission, a modulation and coding scheme (MCS) that is a basic data rate that is used for control frame transmission or a data rate set relating to a data rate at which data transmission and reception are possible, and the like. Moreover, it is also considered that, in the AP, an antenna directivity pattern is changed dynamically by analog or digital beamforming, antenna switching, or the like and thus that a size or a shape of a communication area is set to be variable.

In the AP, as methods of selecting and setting a frequency channel, a bandwidth, and other parameters, there are four methods as follows.

(1) Method of using a default parameter value, as is, that is set by a company that manufactures APs (2) Method of using a value that is set manually by a user who operates the AP (3) Method of selecting and setting a parameter value autonomously based on wireless environment information that is detected in each AP itself when the AP is activated (4) Method of setting a parameter value that is determined in a central coordinator such as a wireless LAN controller In the wireless LAN, because this control is performed, the greater the number of BSSs, the more the throughput decreases. Therefore, there is a need to monitor an ambient wireless environment and to set various parameters such as the suitable channel, the transmission power value, and the CCA threshold.

Moreover, because the wireless LAN operates with the CSMA/CA as described above, in an environment where BSSs are arranged at high density, the frequency with which a channel is busy due to interference in the carrier sense increases. Because of this, the transmission opportunity to obtain the channel access right decreases. For this reason, for example, in Non-Patent Document 1: J. Zhu (Intel), et al., "Adaptive CSMA for Scalable Network Capacity in High-Density WLAN: a Hardware Prototyping Approach" in the Proceedings IEEE INFOCOM, 2006 and Non-Patent Document 2: H. Ma, et al., "On Loss Differentiation for CSMA-Based Dense Wireless Network", IEEE Communication Letters, Vol. 11, No. 11, pp. 877-879, November 2007, in order to improve throughput, it is proposed that parameters, such as the antenna directivity pattern, the transmission power value, the CCA threshold, and an RS threshold, are controlled, and thus that a communication area of the BSS is controlled and the transmission opportunity increases.

DISCLOSURE

Problems to be Solved

In the methods (1) to (4) of selecting and setting the frequency channel or the transmission power value, and other parameters, which are described above, in some cases, particularly, a low cost AP uses a default parameter, as is, that is set in a manufacturing company. However, in an environment where multiple APs that are manufactured in the same companies are nearly installed, because all APs use the same frequency channel or transmission power value, there is a problem in that interference occurs among the APs and thus communication quality deteriorates.

It is considered that, in ordinary houses or comparatively small-sized networks, a user who operates a wireless LAN sets suitable parameters. Particularly, in an environment where an external interference source is not present, setting of various parameters is possible, but in an environment where the wireless LAN is used in the surrounding environment, such as in an urban area or a housing complex, or in a medium-sized or large-sized network, it is difficult for a user or a manager to set parameter values suitable for each of the wireless LANs.

In the AP that is capable of autonomously distributed operation, which autonomously selects parameter values based on the wireless environment information that is detected in each AP itself when the AP is activated, a suitable parameter value differs with the order of activation. Furthermore, because each of the APs selects and sets parameter values that are optimal in the AP itself, local optimization is possible, but an entire system cannot be optimized. Furthermore, if an ambient wireless environment changes, this is difficult to deal with.

Furthermore, in an AP or a wireless LAN controller in the related art, resetting of the parameter that is selected one time is not basically performed. For example, although environmental changes occur such as a change in the number of APs that is activating, a change in the number of wireless terminal devices under the control of each AP, and a change in an amount of data that is sent out by a wireless device within each cell, comprehensive optimization of parameters in use is not performed. For this reason, there is a problem in that a difference in throughput between each of the cells occurs, or in that throughput deteriorates throughout a system.

For this reason, for example, in a small-sized or large-sized wireless LAN system formed with several tens or several hundreds of APs, in such environments as a university campus, an office, a stadium, and station premises, a central control device such as the wireless LAN controller is installed, and a method is performed in which parameter values for each AP are determined by the wireless LAN controller and in which control of the AP is performed.

Furthermore, in order for the wireless LAN controller to perform setting of optimal parameters, there is a need to collect pieces of information relating to a wireless environment or traffic situation from control-target APs, wireless stations that belong to the control-target APs, user terminals that use an individual frequency such as a licensed band, and the like, and to process the collected pieces of information and calculate optimal parameters. On the other hand, the number of APs that use unlicensed bands, which include wireless LAN routers that are temporarily installed, and the number of wireless stations that use these increases rapidly. There is a problem in that for this reason, an amount of information that is collected becomes enormous and that it takes much time to calculate parameters.

A relationship between the attenuator value (ATT value) that is set in an attenuator of each AP and the service area where prescribed communication quality can be secured is described here with respect to FIG. 10.

In FIG. 10, each of an AP 1 to an AP 3 performs communication with a wireless station that belongs to each of the AP 1 to the AP 3, using a common frequency channel. A circle with each of the AP 1 to the AP 3 at the center schematically illustrates the service area in accordance with the ATT value. If the ATT value is high, as illustrated in (1) of FIG. 10, a service area of each of the AP 1 to the AP 3 decreases. For this reason, an interference-causing situation or an interference-influenced situation among the APs occurs less frequently, and thus the reuse of the frequency channel is possible. However, a dead zone in which communication cannot be performed occurs. If the ATT value is low, as illustrated in (2) of FIG. 10, a service area of each of the AP 1 to the AP 3 increases. For this reason, in a place where service areas overlap, the interference-causing situation or the interference-influenced situation occurs more frequently among the APs, and thus the right to access a channel is difficult to acquire and throughput of the entire wireless communication system decreases.

A proposition of the present invention is to provide a wireless communication system that is capable of optimizing an ATT value for each AP in a high density wireless LAN environment considering a close relationship between service quality of a user terminal and the ATT value for an antenna of each AP, and of improving throughput of the entire wireless communication system, and a wireless communication method.

Means for Solving the Problems

According to a first invention, there is provided a wireless communication system including a plurality of APs each forming a service area using antennas, an ATT value (attenuator value) for each of which is controllable, and each performing wireless communication with a wireless station that belongs to each the AP, under prescribed access control; and a central coordinator being connected to the plurality of APs, and setting the ATT value for each the AP based on wireless environment information on the plurality of APs, in which each the AP includes a control unit that detects, as the wireless environment information, a signal detection level for one or more neighboring APs that are positioned in the neighborhood of the AP and notifies the detected signal detection level to the central coordinator, and that controls the ATT value by the setting in the central coordinator; and the central coordinator includes a parameter calculation unit that calculates the ATT value for each the AP, based on the signal detection level for each the neighboring AP notified from the plurality of APs and based on an RSSI threshold at which each the AP is able to secure a prescribed service area.

In the wireless communication system according to the first invention, the parameter calculation unit of central coordinator is configured to select a benchmark AP that corresponds to the prescribed service area, based on the signal detection level for each the AP, which is detected in the neighboring APs of the APs, and to calculate a value whose signal detection level of the benchmark AP exceeds the RSSI threshold as the ATT value for each the AP.

In the wireless communication system according to the first invention, the parameter calculation unit of the central coordinator is configured to compare between the signal detection level for each the AP, which are detected in the neighboring APs of the APs, and to select a neighboring AP in which the signal detection level is the N-th (N is an integer of one or more) largest, as the benchmark AP.

In the wireless communication system according to the first invention, the parameter calculation unit of the central coordinator is configured to select M (M is an integer of three or more) neighboring APs that form the largest area where a service is providable from the AP, from the neighboring APs of the APs, and to select a neighboring AP having the minimum signal detection level, which is detected in the neighboring APs, as the benchmark AP.

In the wireless communication system according to the first invention, the parameter calculation unit of the central coordinator is configured to correct the signal detection level for each the neighboring AP, which is detected in the APs, using the ATT value that is set for each the neighboring AP.

According to a second invention, there is provided a wireless communication method in a wireless communication system that includes a plurality of APs each forming a service area using antennas, an ATT value for each of which is controllable, and each performing wireless communication with a wireless station that belongs to each the AP, under prescribed access control; and a central coordinator being connected to the plurality of APs, and setting the ATT value for each the AP based on wireless environment information on the plurality of APs, the method including a first step causing the AP to detect, as the wireless environment information, a signal detection level for one or more neighboring APs that are positioned in the neighborhood of the AP, and to notify the detected signal detection level to the central coordinator; a second step causing the AP to control the ATT value by the setting in the central coordinator; and a third step causing the central coordinator to calculate the ATT value for each the AP, based on the signal detection level for each the neighboring AP notified from the plurality of APs and based on an RSSI threshold at which each the AP is able to secure a prescribed service area.

In the wireless communication method according to the second invention, in the third step, the central coordinator selects a benchmark AP that corresponds to the prescribed service area, based on the signal detection level for each the AP, which is detected in the neighboring APs of the APs, and calculates a value whose signal detection level of the benchmark AP exceeds the RSSI threshold as the ATT value for each the AP.

In the wireless communication method according to the second invention, in the third step, the central coordinator corrects the signal detection level for each the neighboring AP, which is detected in the APs, using the ATT value that is set for each the neighboring AP.

Effect

According to the present invention, in a central coordinator, an optimal ATT value for securing a value that is at or above a prescribed RSSI threshold is calculated based on a signal detection level of a neighboring AP, which is detected by each AP, and the calculated optimal ATT value is set to be in each AP. Thus, a service area of each AP where a prescribed service quality can be secured can be formed and throughput of an entire wireless communication system can be improved.

BRIEF DESCRIPTION OF THE DRAWINGS

FIG. 5 is a diagram illustrating an example of an arrangement of antennas of each of an AP 1 to an AP 4.

FIG. 6 is a diagram illustrating ATT value and RSSI value for each antenna of the AP 1 to the AP 4.

FIG. 7 is a diagram illustrating correction of the RSSI value for each antenna of the AP 1 to the AP 4.

FIG. 8 is a diagram illustrating the RSSI value for each neighboring AP of the AP 1 to AP 4.

FIG. 9 is a diagram illustrating an example of calculation of the ATT value for each of the AP 1 to the AP 4.

FIG. 10 is a diagram illustrating a relationship between the ATT value and a service area of each AP.

DETAILED DESCRIPTION OF THE PREFERRED EMBODIMENTS

Figure 1:
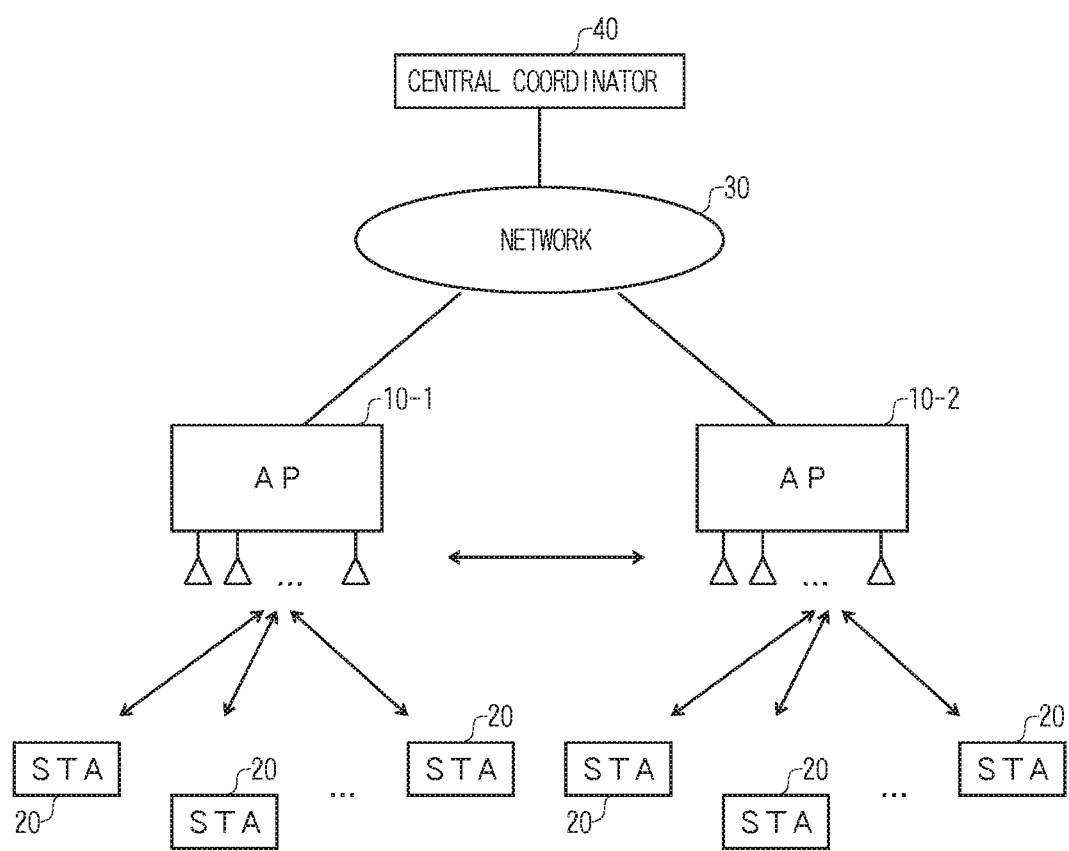
FIG. 1 is a diagram illustrating an example of a configuration of a wireless communication system according to the present invention.

FIG. 1 illustrates an example of a configuration of a wireless communication system according to the present invention.

In FIG. 1, wireless access points (AP) 10-1 and 10-2 communicate wirelessly with a wireless station (STA) 20 that belongs to each of the wireless access points (APs) 10-1 and 10-2 in a common wireless frequency band. The APs 10-1 and 10-2 are connected to a central coordinator 40 through a network 30. The central coordinator 40 collects wireless environment information in the APs 10-1 and 10-2, calculates an optimal parameter value for each AP, and sets the calculated the optimal parameter value to be in each AP.

Figure 2:
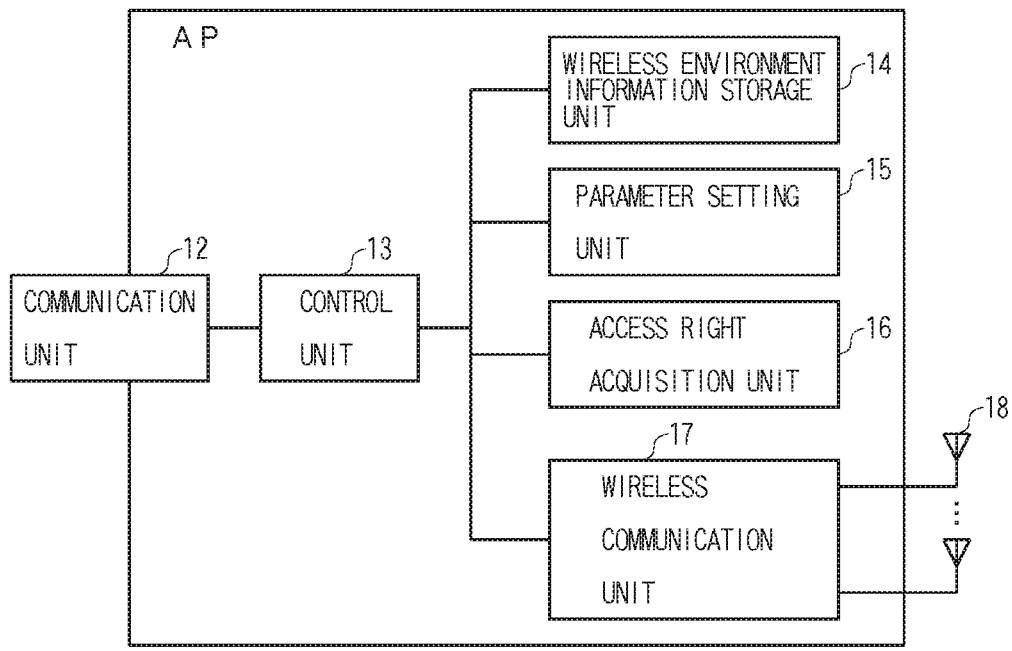
FIG. 2 is a diagram illustrating an example of a configuration of an AP in the wireless communication system according to the present invention.

FIG. 2 illustrates an example of a configuration of the AP in the wireless communication system according to the present invention.

In FIG. 2, the AP includes a communication unit 12, a control unit 13, a wireless environment information retention unit 14, a parameter setting unit 15, an access right acquisition unit 16, a wireless communication unit 17, and an antenna unit 18.

The communication unit 12 communicates with the central coordinator 40 through the network 30 that is illustrated in FIG. 1. The wireless environment information retention unit 14 retains the wireless environment information that is acquired by periodically scanning the neighborhood of the AP. The parameter setting unit 15 sets a parameter value that is notified by the central coordinator 40. The access right acquisition unit 16 acquires the right to access for data communication in the common wireless frequency band. The wireless communication unit 17 uses a parameter that is set by the parameter setting unit 15. Based on the right to access, which is acquired in the access right acquisition unit 16, the wireless communication unit 17 performs the data communication with the STA that is a destination, through the antenna unit 18. The control unit 13 controls operations by the AP in an integrated manner.

Figure 3:
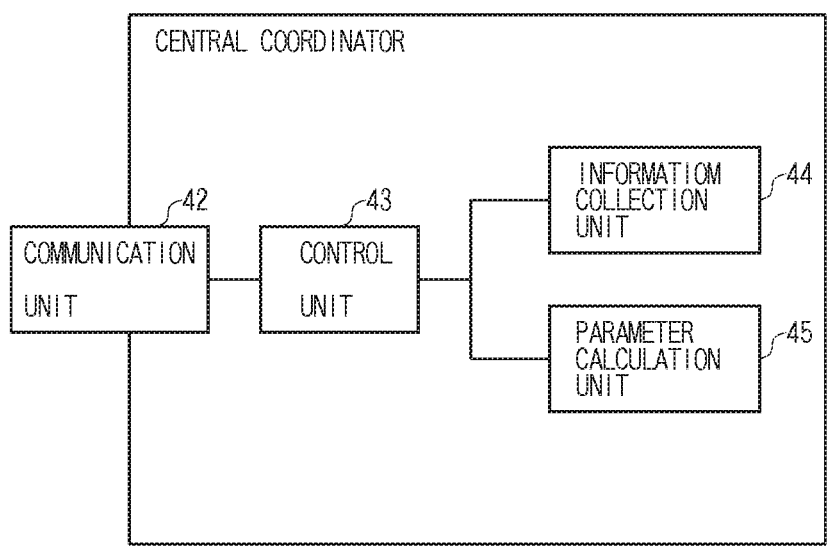
FIG. 3 is a diagram illustrating an example of a configuration of a central coordinator in the wireless communication system according to the present invention.

FIG. 3 illustrates an example of a configuration of the central coordinator in the wireless communication system according to the present invention.

In FIG. 3, the central coordinator includes a communication unit 42, a control unit 43, an information collection unit 44, and a parameter calculation unit 45.

The communication unit 42 communicates with the APs 10-1 and 10-2 that are control targets which are present within the wireless communication system, through the network 30 that is illustrated in FIG. 1. The information collection unit 44 collects and retains pieces of wireless environment information that are acquired by the APs 10-1 and 10-2. Based on the pieces of wireless environment information that are collected in the information collection unit 44, the parameter calculation unit 45 determines parameters, such as a carrier sense threshold, a transmission power value, and an ATT value, that are allocated to each of the APs 10-1 and 10-2. The control unit 43 controls operations by the central coordinator 40 in an integrated manner.

The antenna unit 18 of each AP here is configured with one or multiple antennas. The wireless environment information that is collected by the information collection unit 44 of the central coordinator 40 refers to a signal detection level of a neighboring AP, which is detected by an antenna of each AP, and, for example, refers to an RSSI value for a beacon signal that is transmitted from the neighboring AP. Based on the signal detection level of the neighboring AP, the parameter calculation unit 45 calculates the ATT value for securing a prescribed service area in each AP, and sets the calculated ATT value in each AP. This procedure will be described below with reference to FIG. 4.

Figure 4:
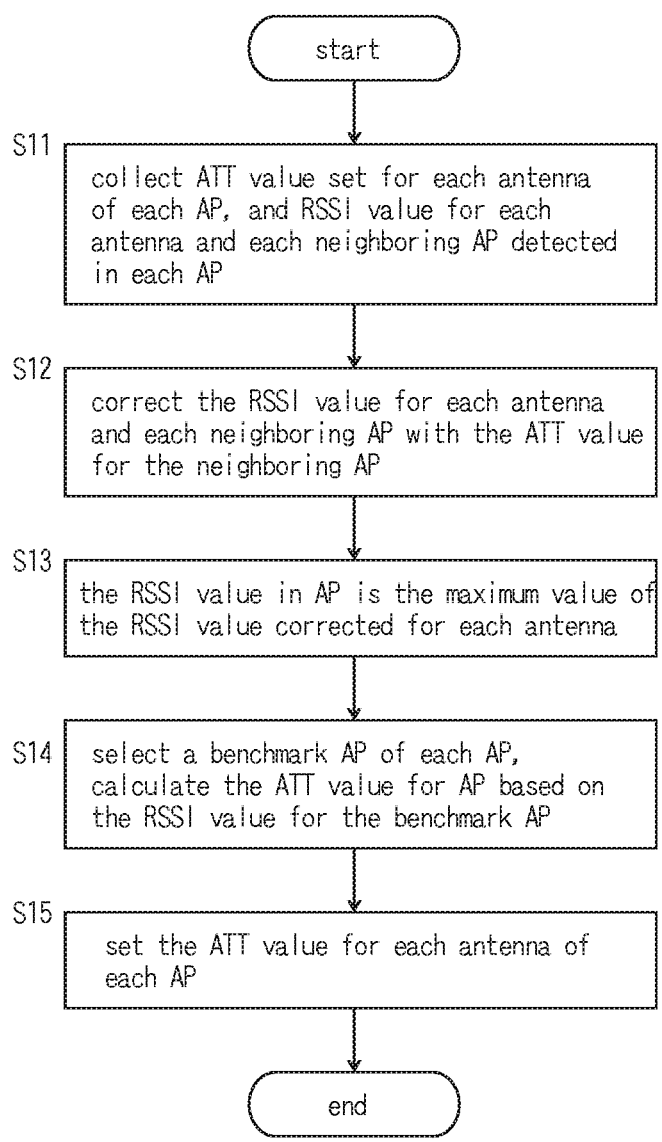
FIG. 4 is a flowchart illustrating an outline of a procedure for processing by the central coordinator.

FIG. 4 illustrates an outline of a procedure for processing by the central coordinator.

In FIG. 4, the information collection unit 44 collects the ATT value that is set for each antenna of each AP, and a RSSI value for each antenna and each neighboring AP detected in each AP (S11). A specific example of this is illustrated in FIG. 6.

Using the ATT value and RSSI value for each AP, which are collected by the information collection unit 44, the parameter calculation unit 45 calculates an optimal ATT value for each AP, using the following procedure.

First, because a signal is transmitted in each AP using the ATT value that is set for each antenna, the RSSI value for each antenna and each neighboring AP detected in each AP is corrected with the ATT value for the neighboring AP (S12). As for the ATT value for the neighboring AP at this time, a minimum value of the ATT value for each antenna, is used. A specific example of this is illustrated in FIG. 7.

Next, a maximum value is searched for among the RSSI values that are corrected for each antenna of the AP, and the maximum value that is found is set as an RSSI value for each neighboring AP in the AP (S13). A specific example of this is illustrated in FIG. 8.

Next, a benchmark AP for determining a range of a service area based on an RSSI value for the AP, which is detected in the neighboring AP in the neighborhood of the AP is selected, and an ATT value for the AP is calculated based on an RSSI value for the benchmark AP (S14). For example, the RSSI value for the benchmark AP and an RSSI threshold for securing the service area are compared, and, if the RSSI value for the benchmark AP is greater than the RSSI threshold, a difference between them is calculated as the ATT value. A specific example of this is illustrated in FIG. 9.

Last, the ATT value for each antenna is set in each AP and the processing is ended (S15).

An example of calculation of an optimal ATT value for each AP in the central coordinator 40 will be described below with reference to FIGS. 5 to 9.

FIG. 5 illustrates an example of an arrangement of antennas of an AP 1 to an AP 4. At this point, the AP 1 has antennas A11 to A14, the AP 2 has antennas A21 to A24, the AP 3 has antennas A31 and A32, and the AP 4 has an antenna A41. The AP 1 to the AP 4 determine the RSSI value among the APs in each antenna. For example, in the AP 1, signals that are transmitted from the neighboring AP 2 to AP 4 are received, RSSI values that are categorized on a basis of each of the AP 2 to the AP 4 are measured on a basis of each of the antennas A11 to A14 of the AP 1, and the resulting RSSI values are notified to the central coordinator 40.

FIG. 6 illustrates ATT value and RSSI value for each antenna of the AP 1 to the AP 4 (S11 in FIG. 4). For example, ATT values that are set in the antennas A11 to A14 of the AP 1 are 1, 0, 0, and 1, respectively. RSSI values for the neighboring AP 2 in the antennas A11 to A14 of the AP 1 are a not-detected value, −80 dBm, −70 dBm, and −60 dBm, respectively. RSSI values for the AP 3 are −93 dBm, −83 dBm, −83 dBm, and −93 dBm, respectively. RSSI values for the AP 4 in the antennas A11 to A14 are a not-detected value, a not-detected value, −85 dBm, and −73 dBm, respectively. The ATT value and the RSSI value for each antenna of the AP 2 to the AP 4 are also as illustrated in FIG. 6.

FIG. 7 illustrates correction of the RSSI value for each antenna of the AP 1 to AP 4 (S12 in FIG. 4). RSSI value for each antenna of an AP i (i ranges from 1 to 4) is corrected using a minimum value of ATT value for each antenna of a neighboring AP j (j ranges from 1 to 4 and j≠i). The reason for this is that the AP i is scanned with the ATT value being setting to 0 and the neighboring APj is transmitted using the set ATT value, and thus that the RSSI value that uses the ATT value for the neighboring AP j in the AP i needs to be corrected.

At this point, minimum values of the ATT values for the antennas in each of the AP 1 to AP 4 are 0, 0, 3, and 5, respectively. Therefore, the RSSI values for the neighboring AP 2, which are detected in the antennas A11 to A14 of the AP 1 are not corrected, the RSSI values for the neighboring AP 3 are corrected by adding 3 dB and thus are −90 dBm, −80 dBm, −80 dBm, and −90 dBm, respectively. The RSSI values for the neighboring AP 4 are corrected by adding 5 dB, and thus are a not-detected value, a not-detected value, −80 dBm, and −68 dBm, respectively. The RSSI values for the neighboring APs, which are detected in the antennas of each of the AP 2 to the AP 4 are also as illustrated in FIG. 7.

FIG. 8 illustrates the RSSI value for each neighboring AP in the AP 1 to the AP 4 (S13 in FIG. 4). At this point, the AP 1, the AP 2, and the AP 3 each of which has multiple antennas are targets. For example, in the antennas A11 to A14 in the AP 1, a maximum value of the RSSI values for the neighboring AP 2, which result from the correction is −60 dBm, a maximum value of the RSSI values for the neighboring AP 3, which result from the correction is −80 dBm, and a maximum value of the RSSI values for the neighboring AP 4, which result from the correction is −68 dBm. Accordingly, the RSSI values for the neighboring AP 2, AP 3, and AP 4 in the AP 1 are −60 dBm, −80 dBm, and −68 dBm, respectively. The RSSI value for each neighboring APs in the AP 2 to AP 4 is also as illustrated in FIG. 8.

FIG. 9 illustrates an example of the calculation of the ATT values for the AP 1 to the AP 4 (S14 in FIG. 4). The AP i selects the benchmark AP for determining the range of the service area. If the RSSI value for the benchmark AP is higher than the RSSI threshold for securing the service area, a difference between the RSSI value and the RSSI threshold is set to be an ATT value for the AP i.

A method for the AP i to select the benchmark AP is that RSSI values for the AP i, which are detected in the neighboring AP j in the neighborhood of the AP i are compared and the neighboring AP of which the RSSI value is the N-th highest (N is an integer of one or more) is selected as the benchmark AP. It is noted that, for example, N may be a number that is smaller by 1 than the total number of channels that are used in the system. Alternatively, M (M is an integer of three or more) neighboring APs that form the largest area where a service is providable may be selected from among the AP i and a neighboring AP of which an RSSI value is minimized may be selected, as the benchmark AP, from among the selected M neighboring APs. This is done in such a manner that there are N or M neighboring APs within a service area of the AP i, and the ATT value is set in such a manner that the AP i can be detected in these neighboring APs. Furthermore, if the number of APs with the system is smaller than N or M, an AP of which an RSSI value is smallest may be set to be the benchmark AP.

In an example in FIG. 9, the RSSI threshold for securing the service area is set to −70 dBm. When N=2, because the RSSI values for the AP 1 in the neighboring AP 2, AP 3, and AP 4 in the neighborhood of the AP 1 are −61 dBm, −76 dBm, and −76 dBm, respectively, the benchmark AP selected by the AP 1 is the AP 3 or the AP 4 of which the RSSI values is −76 dBm that is the second largest. At this time, the RSSI value for the AP 1 in the benchmarks AP 3 and AP 4 falls below the RSSI threshold. Because of this, the ATT value for the AP 1 is set to 0 dB. Because the RSSI values for the AP 2 in the neighboring AP 1, AP 3, and AP 4 in the neighborhood of the AP 2 are −60 dBm, −80 dBm, and −65 dBm, respectively, the benchmark AP selected by the AP 2 is the AP 4 of which the RSSI value is −65 dBm that is the second largest. At this time, the RSSI value for the AP 2 in the benchmark AP 4, which is −65 dBm, exceeds the RSSI threshold. Because of this, the ATT value for the AP 2 is set to 5 dB that is a difference between the RSSI value and the RSSI threshold.

Because the RSSI values for the AP 3 in the neighboring AP 1, AP 2, and AP 4 in the neighborhood of the AP 3 are −80 dBm, −90 dBm, and −85 dBm, respectively, the benchmark AP selected by AP 3 is the AP 4 of which the RSSI value is −85 dBm that is the second largest. At this time, the RSSI value for the AP 3 in the benchmark AP 4 falls below the RSSI threshold. Because of this, the ATT value for the AP 3 is set to 0 dB. Because the RSSI values for the AP 4 in the neighboring AP 1, AP 2, and AP 3 in the neighborhood of the AP 4 are −68 dBm, −60 dBm, and −85 dBm, respectively, the benchmark AP selected by the AP 4 is the AP 1 of which the RSSI value is −68 dBm that is the second largest. At this time, the RSSI value for the benchmark AP 1 in the AP 4, which is −68 dBm, exceeds the RSSI threshold. Because of this, the ATT value for the AP 4 is set to 2 dB that is a difference between the RSSI value and the RSSI threshold.

As described above, consequently, the ATT values for the antennas A11 and A14 of the AP 1 range from 1 dB to 0, the ATT value for the antennas A12 and A13 is 0 without any change, and the service area is broadened to some extent. The ATT values for the antennas A21 to A24 of the AP 2 range from 0 to 5 dB, and the service area is narrowed. The ATT value for the antenna A31 of the AP 3 ranges from 10 dB to 0, the ATT value for the antenna A32 ranges 3 dB to 0, and the service area is broadened. The ATT value for the antenna A41 of the AP 4 ranges from 5 dB to 2 dB, and the service area is broadened. In this manner, by optimizing the ATT values for the antennas of each of the AP 1 to the AP 4, the service areas of the AP 1 to the AP 4, where a prescribed service quality can be secured, are formed. Thus, throughput of the entire wireless communication system can be improved.

In the embodiment described above, the example of calculating the ATT value on a per-AP basis is described, but it is also possible that the ATT value is calculated on a per-antenna basis or on the basis of an antenna group of multiple antennas.

Furthermore, when the ATT value that is calculated using a procedure in the embodiment described above is set to be in each AP, a propagation loss that results from considering a cable length or the like of each antenna, or the ATT value for each antenna that results from considering an initial value of the ATT value that is set in advance may be set.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system comprising:
    a plurality of wireless access points each forming a service area using antennas, an attenuator value for each of which is controllable, and each performing wireless communication with a wireless station that belongs to each the wireless access point, under prescribed access control; and
    a central coordinator being connected to the plurality of wireless access points, and setting the attenuator value for each the wireless access point based on wireless environment information on the plurality of wireless access points, wherein:
    each the wireless access point includes a control unit that detects, as the wireless environment information, a signal detection level for one or more neighboring wireless access points that are positioned in the neighborhood of the wireless access point and notifies the detected signal detection level to the central coordinator, and that controls the attenuator value by the setting in the central coordinator; and
    the central coordinator includes a parameter calculation unit that calculates the attenuator value for each the wireless access point, based on the signal detection level for each the neighboring wireless access point notified from the plurality of wireless access points and based on an RSSI threshold at which each the wireless access point is able to secure a prescribed service area;
    wherein the parameter calculation unit calculates the attenuator value for a given wireless access point by selecting a benchmark access point for the given wireless access point that corresponds to the prescribed service area, based on the signal detection level for each the wireless access point, which is detected in the neighboring wireless access points of the wireless access points, and calculating a value whose signal detection level of the benchmark access point exceeds the RSSI threshold as the attenuator value for the given wireless access point;
    wherein the parameter calculation unit of the central coordinator is configured to select the benchmark access point for the given wireless access point by selecting M, where M is an integer of three or more, neighboring wireless access points that form the largest area where a service is providable from the wireless access point, from the neighboring wireless access points of the wireless access points, and selecting a neighboring wireless access point having the minimum signal detection level, which is detected in the selected neighboring wireless access points, as the benchmark access point.

2. The wireless communication system according to claim 1, wherein
    the parameter calculation unit of the central coordinator is configured to correct the signal detection level for each the neighboring wireless access point, which is detected in the wireless access points, using the attenuator value that is set for each the neighboring wireless access point.

3. A wireless communication method in a wireless communication system that includes a plurality of wireless access points each forming a service area using antennas, an attenuator value for each of which is controllable, and each performing wireless communication with a wireless station that belongs to each the wireless access point, under prescribed access control; and
    a central coordinator being connected to the plurality of wireless access points, and setting the attenuator value for each the wireless access point based on wireless environment information on the plurality of wireless access points, the method comprising:

a first step causing the wireless access point to detect, as the wireless environment information, a signal detection level for one or more neighboring wireless access points that are positioned in the neighborhood of the wireless access point, and to notify the detected signal detection level to the central coordinator;

a second step causing the wireless access point to control the attenuator value by the setting in the central coordinator; and a third step causing the central coordinator to calculate the attenuator value for each the wireless access point, based on the signal detection level for each the neighboring wireless access point notified from the plurality of wireless access points and based on an RSSI threshold at which each the wireless access point is able to secure a prescribed service area;

wherein the attenuator value for a given wireless access point is calculated by selecting M, where M is an integer of three or more neighboring wireless access points that form the largest area where a service is providable from the wireless access point, from the neighboring wireless access points of the wireless access points, selecting a neighboring wireless access point having the minimum signal detection level, which is detected in the selected neighboring wireless access points, as the benchmark access, and calculating the attenuator value for the given wireless access point as difference between signal detection level of the benchmark access point and the RSSI threshold.

4. The wireless communication method according to claim 3, wherein in the third step, the central coordinator corrects the signal detection level for each the neighboring wireless access point, which is detected in the wireless access points, using the attenuator value that is set for each the neighboring wireless access point.

* * * * *